US010232962B2

(12) United States Patent
Kurachi et al.

(10) Patent No.: US 10,232,962 B2
(45) Date of Patent: Mar. 19, 2019

(54) ARTICLE DROPPING APPARATUS AND METHOD (71) Applicant: YUTAKA MFG CO., LTD, Kounan-shi, Aichi (JP)

(72) Inventors: Masayasu Kurachi, Kounan (JP); Katsumi Kuno, Kasugai (JP)

(73) Assignee: YUTAKA MFG. CO., LTD., Kounan-Shi, Aichi (JP)

( * ) Notice: Subject to any disclaimer, the term of this patent is extended or adjusted under 35 U.S.C. 154(b) by 0 days.

(21) Appl. No.: 15/813,198

(22) Filed: Nov. 15, 2017

(65) Prior Publication Data
US 2018/0134422 A1 May 17, 2018

(30) Foreign Application Priority Data

Nov. 17, 2016 (JP) .................................. 2016-223898

(51) Int. Cl.
| | |
|---|---|
| *B65B 5/06* | (2006.01) |
| *B65B 5/10* | (2006.01) |
| *B65G 47/38* | (2006.01) |
| *B65G 21/10* | (2006.01) |
| *B65G 47/52* | (2006.01) |
| *B65B 25/14* | (2006.01) |
| *B65B 9/04* | (2006.01) |
| *B65B 35/50* | (2006.01) |

(52) U.S. Cl.
CPC ................ *B65B 5/101* (2013.01); *B65B 9/04* (2013.01); *B65B 25/14* (2013.01); *B65G 21/10* (2013.01); *B65G 47/38* (2013.01); *B65G 47/52* (2013.01); *B65B 5/06* (2013.01); *B65B 35/50* (2013.01)

(58) Field of Classification Search
CPC .......... B65B 5/101; B65B 5/10; B65B 35/50; B65G 35/50; B65G 21/10; B65G 21/12; B65G 21/14; B65G 47/38; B65G 47/52; B65G 47/642
USPC .......... 271/73; 414/789, 789.2, 790.1, 790.4, 414/790.5, 790.8, 790.9, 793.4, 793.6, 414/794.2; 193/2 R, 14, 36; 198/617, 198/307, 347, 369.7
See application file for complete search history.

(56) References Cited

U.S. PATENT DOCUMENTS 9,132,972 B2 * 9/2015 Kurachi ................ B65G 21/10

FOREIGN PATENT DOCUMENTS

JP 3088772 B2 12/1992

* cited by examiner

*Primary Examiner* — Timothy R Waggoner
*Assistant Examiner* — Lester III Rushin
(74) *Attorney, Agent, or Firm* — Ladas & Parry LLP; Malcolm J. MacDonald (57) ABSTRACT An article dropping apparatus may include a first shutter and a second shutter. A first movable member is movable relative to the first shutter. A second movable member is movable relative to the second shutter. An article may be supported by the first shutter and the second shutter to extend therebetween when the first shutter and the second shutter are positioned at closed positions. The first movable member and the second movable member may keep a relative position with respect to the article, via use of clamping members, during the movement of the first and second shutters from closed positions to open positions.

12 Claims, 9 Drawing Sheets

FIG. 9 ically describe representative examples of the invention.
ARTICLE DROPPING APPARATUS AND METHOD This application claims priority to Japanese patent application serial number 2016-223898, the contents of which are incorporated herein by reference.

BACKGROUND OF THE INVENTION

Field of the Invention

Embodiments of the present invention relate to an article dropping apparatus used for dropping articles into containers.

Description of the Related Art

Japanese Patent No. 3088772 discloses an article dropping apparatus used for dropping articles that are U-shaped bags (known as "T-shirt bags") formed of plastic films and stacked in a layered manner. The article dropping apparatus includes a shutter device having a pair of shutters with end portions opposed to each other. In the state where the shutters are closed such that their end portions are positioned close to each other, the stacked articles may be put on the shutter device so as to straddle the end portions. Thereafter, the shutters are opened such that their end portions move away from each other. When this occurs, the stacked articles may be dropped into a container that has an upper opening located below the shutter device. In this way, the stacked articles can be dropped into the container for subsequent packaging while the stacked state of the stacked articles is maintained.

However, because frictional forces are applied to the stacked articles by the shutters when the end portions of the shutters move away from each other, it may cause a variation in the dropped position of the stacked articles into the container.

Therefore, there has been a need in the art for a technique of preventing or minimizing a variation in a dropped position of stacked articles when the stacked articles are dropped from an article dropping apparatus.

SUMMARY OF THE INVENTION

In one aspect according to the present teachings, an article dropping apparatus may include a first shutter and a second shutter. A first movable member is movable relative to the first shutter. A second movable member is movable relative to the second shutter. An article may be supported by the first shutter and the second shutter to extend therebetween when the first shutter and the second shutter are at closed positions. The first movable member and the second movable member may keep a position relative to the article during the movement of the first and second shutters from closed positions to open positions.

DETAILED DESCRIPTION OF THE INVENTION

Each of the additional features and teachings disclosed above and below may be utilized separately or in conjunction with other features and teachings to provide an improved article dropping apparatus. Representative examples of the present invention, which examples utilize many of these additional features and teachings both separately and in conjunction with one another, will now be described in detail with reference to the attached drawings. This detailed description is merely intended to teach a person of skill in the art further details for practicing preferred aspects of the present teachings and is not intended to limit the scope of the invention. Only the claims define the scope of the claimed invention. Therefore, combinations of features and steps disclosed in the following detailed description may not be necessary to practice the invention in the broadest sense, and are instead taught merely to particularly describe representative examples of the invention. Moreover, various features of the representative examples and the dependent claims may be combined in ways that are not specifically enumerated in order to provide additional useful examples of the present teachings. Various examples will now be described with reference to the drawings.

In one embodiment, an article dropping apparatus may include a first shutter horizontally movable between an open position and a closed position along a first direction, and a second shutter horizontally movable between an open position and a closed position along the first direction. The second shutter may commensurately move from the closed position to the open position as the first shutter moves from the closed position to the open position. The first shutter and the second shutter may be configured collectively to allow a stack of articles to drop from between the first shutter and the second shutter as the first and second shutters move from the closed positions to the open positions. The first shutter may include a first conveyor having a first conveyer belt. The second shutter may include a second conveyor having a second conveyor belt. The first conveyor belt and the second conveyor belt may be configured to support the stack of articles such that the stack has a first portion supported by an upper portion of the first conveyor belt and a second portion supported by an upper portion of the second conveyor belt when the first and second shutters are positioned at the closed positions. The first conveyor and the second conveyer are configured such that the upper portion of the first conveyor belt and the upper portion of the second conveyor belt move in directions toward each other, as the first and second shutters move from the closed positions to the open positions.

In this way, the relative position of the stack of articles to the respective portions of the upper surfaces of the first and second conveyor belts contacting the stack of articles is not substantially changed during the movement of the first shutter and the second shutter from the closed positions to the opening positions for dropping the stack of articles. Consequently, a variation in the dropped position of the stack of articles can be avoided or minimized.

The article dropping apparatus may further include a first drive device, a second drive device and a control unit. The first drive device may be configured to move the first and second shutters from the closed positions to the open positions. The second drive device may be configured to move the first conveyor belt and the second conveyor belt toward each other. The control unit may be coupled to the first and second drive devices and configured to control the first and second drive devices such that (a) the first and second shutters move in sync with each other and (b) the first and second conveyor belts move toward each other in sync with each other, and (c) the upper portions of the first and second conveyor belts move at the same speed as a moving speed of the first and second shutters when the first and second shutters move from the closed positions.

In this way, the relative position of the stack of articles to the portions of the upper surfaces of the first and second conveyor belts contacting the stack of articles is not substantially changed during the movement of the first shutter and the second shutter from the closed positions to the opening positions for dropping the stack of articles. In other words, no substantial kinetic frictional forces may be applied to bottom surfaces of the stack of articles by the movement of the first and second shutters. In this way, the position of the stack of articles in the first and second directions (right and left direction) is not changed during the movement of the first shutter and the second shutter from the shutter's closed position to its opening positions. Thus, a variation in the dropped position of the stack of articles can be avoided or minimized.

A representative embodiment will now be described with reference to the drawings.

Figure 1:
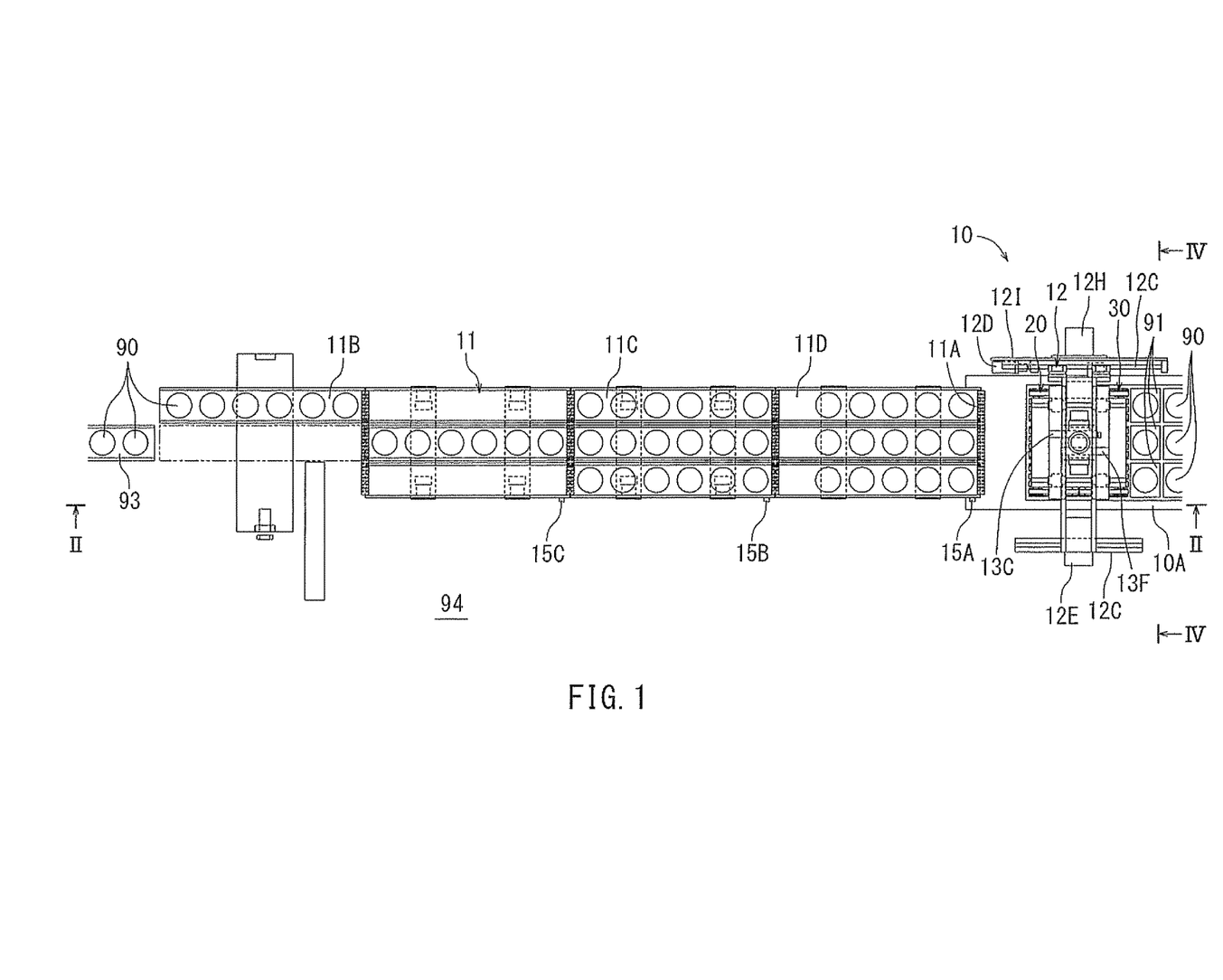
FIG. 1 is a plan view of an article dropping apparatus according to an embodiment.
Figure 2:
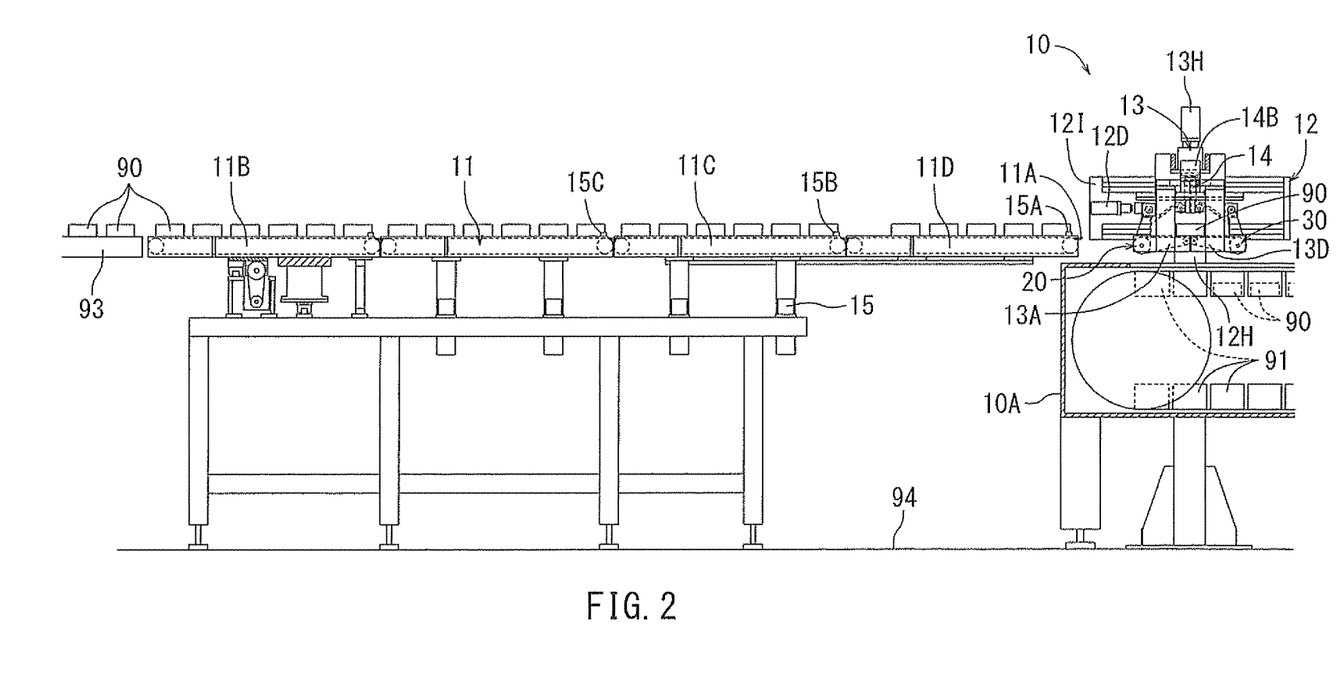
FIG. 2 is a sectional view taken along line II-II in FIG. 1.
Figure 4:
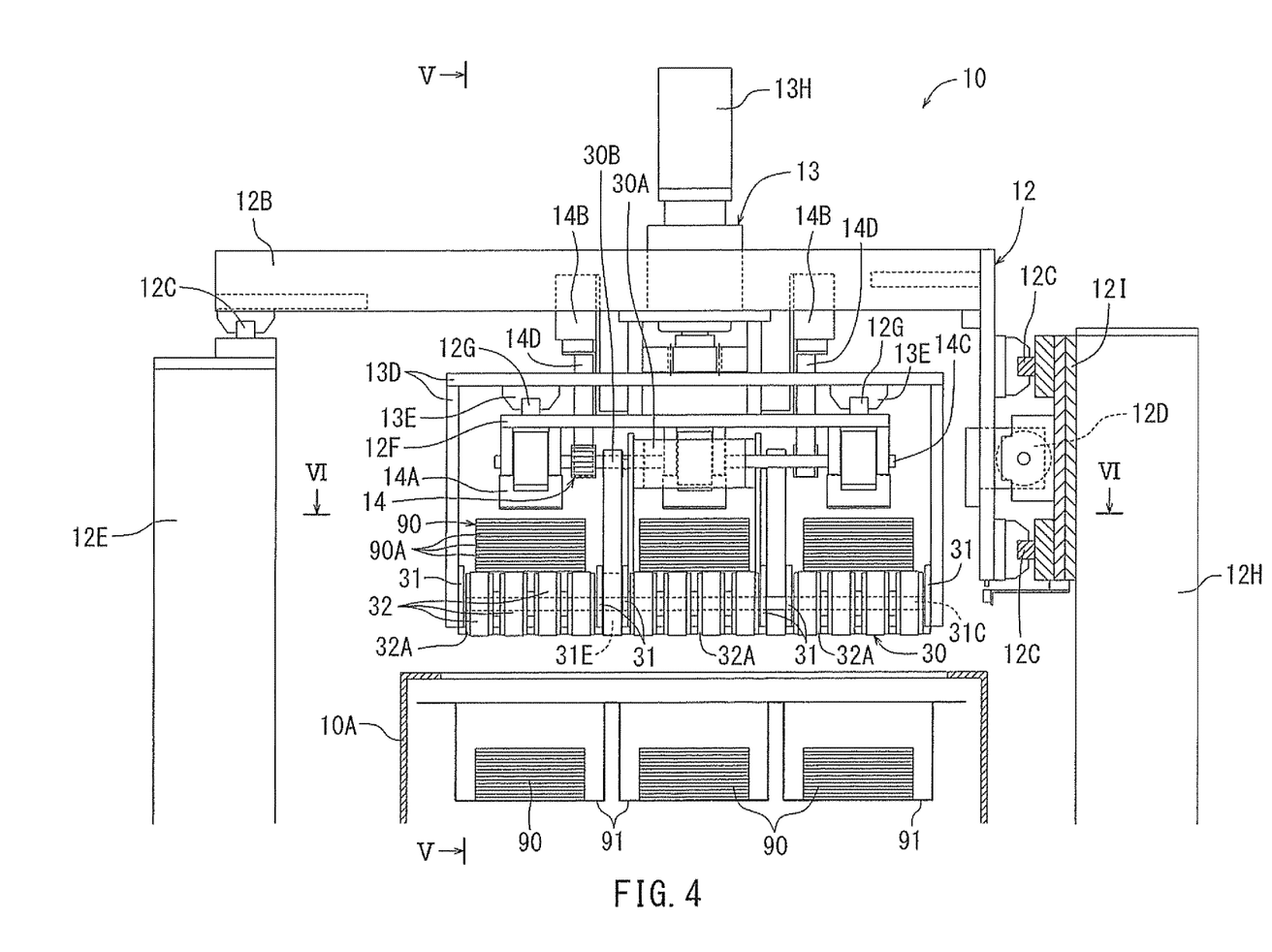
FIG. 4 is a sectional view taken along line IV-IV in FIG. 1.

Referring to FIGS. 1 and 2, a container transfer conveyor 10A may move a plurality of containers 91. An article dropping apparatus 10 may drop a plurality of stacks 90, each having a predetermined number of stacked articles 90A (as seen in FIG. 4), into the containers 91. The stacked articles 90A may be wrapping sheets for gyoza, and each of the article stacks 90 may include, for example, fifty stacked articles 90A in the case of the gyoza wrapping sheets, vertically stacked in a layered manner.

The containers 91 may be formed by using a container forming machine (not shown) external to the article dropping apparatus 10. The containers 91 may be formed from a base film that may be a transparent thermoplastic film such as a polypropylene film. For example, the container forming machine may store the bottom film in a rolled form. The rolled bottom film may then be unrolled and formed into the containers 91 through a continuous vacuum molding process, so that the containers 91 are arranged in three rows and having downwardly oriented openings (downwardly as viewed at the bottom of 10A in FIG. 2, where the openings abut the base of 10A) may be intermittently formed. The containers 91 formed by the container forming machine may be then transferred to the container transfer conveyor 10A. Here, the containers 91 formed through the continuous vacuum molding process are connected to each other. It is not required that the container forming machine separate the containers 91 from each other. Therefore, three rows of the containers 91 connected in series with each other may be collectively fed to the container transfer conveyor 10A (see FIG. 4).

The container transfer conveyor 10A may convey the containers 91 formed by the container forming machine to a heat seal machine (not shown) external to the article dropping apparatus 10. The heat seal machine may then heat-seal a top film that may be a transparent thermoplastic film such as a polypropylene on the containers 91. In this way, deeply drawn packages may be formed by the top film and the containers 91. This will be described later.

During transfer of the containers 91 to the heat seal machine, the container transfer conveyor 10A may turn the containers 91 upside down, so that the openings of the containers 91 are oriented upward (upward as viewed at the top of 10A, where the openings abut the top of 10A). This may allow the article stacks 90 to drop into the containers 91 (see FIG. 5) before the containers 91 are transferred to the heat seal machine. In this way, the heat seal machine may form deeply drawn packages each containing the article stack 90 by the top film and the containers 91.

Figure 5:
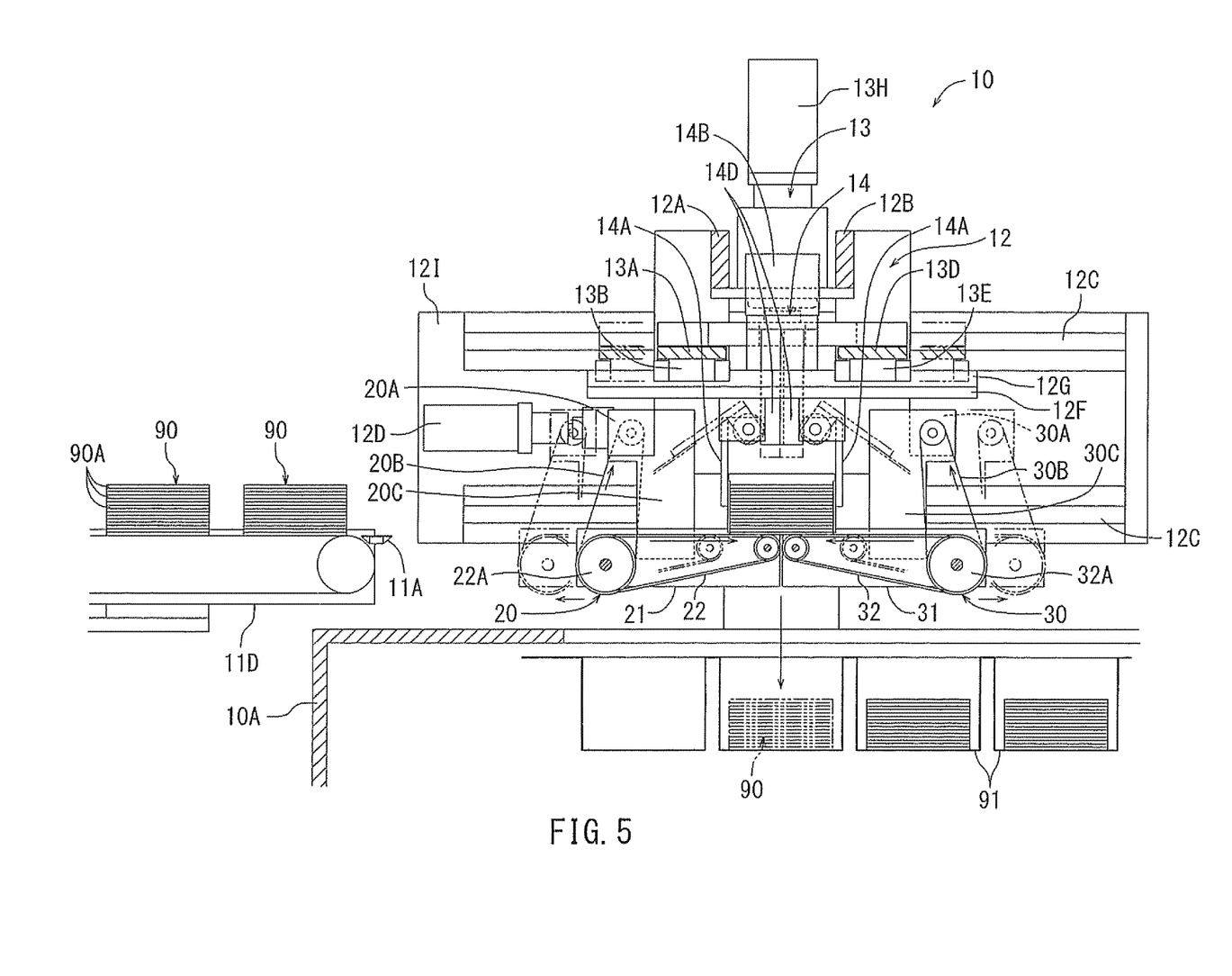
FIG. 5 is a sectional view taken along line V-V in FIG. 4 showing the operation for dropping stacks of articles into containers.

A control unit 15 shown in FIG. 2, comprising a microcontroller, may perform a drive control with respect to the container transfer conveyer 10A, so that the container transfer conveyor 10A is intermittently driven, in sync with the movement of the first shutter 20 and the second shutter 30 of the article dropping apparatus 10 (see FIG. 5). In this way, the container transfer conveyor 10A enables the article stacks 90 to be dropped into the containers 91 that are fed from the container forming machine.

If the stacked articles 90A are wrapping sheets for gyoza, the wrapping sheets may be formed by a wrapping sheet forming machine 93 (see FIG. 1). This wrapping sheet forming machine 93 may knead dough made from a mixture of flour, water and suitable additives such as salt, and may form the dough into sheets. More specifically, the wrapping sheet forming machine 93 may automatically perform operations for rolling the kneaded dough into a dough sheet, sprinkling flour such as cornstarch on the dough sheet, folding back the dough sheet by a given number of times, and punching the folded dough sheet by using punching dies to obtain stacks 90 of stacked articles 90A (gyoza wrapping sheets).

In this way, the wrapping sheet forming machine 93 may manufacture the stacks 90 without the need of manually stacking the articles 90A one by one. In this embodiment, six punching dies may simultaneously punch the folded dough sheet to form six stacks 90 at one time.

As shown in FIGS. 1 and 2, the wrapping sheet forming machine 93 may feed the stacks 90 to a transfer conveyor machine 11 in a state where the stacks 90 are arranged in a row. The transfer conveyor machine 11 may include an automatic distributing device 11B, a standby conveyor 11C including three parallel conveyor sections, and a feeding conveyor 11D including three parallel conveyor sections. The automatic distributing device 11B, the standby conveyor 11C and the feeding conveyor 11D may be arranged in this order from an upstream side, i.e., the side where the stacks 90 are fed from the wrapping sheet forming machine 93 (left side as viewed in FIGS. 1 and 2) toward a downstream side (right side as viewed in FIGS. 1 and 2). More specifically, the automatic distributing device 11B, the standby conveyor 11C and the feeding conveyor 11D may be aligned and arranged along a straight line in a horizontal direction (left and right directions in FIG. 2).

The automatic distributing device 11B may consecutively distribute the stacks 90 fed from the wrapping sheet forming machine 93 to the three parallel conveyer sections of the standby conveyor 11C. The standby conveyor 11C may in turn transfer three rows of distributed stacks 90 to a downstream side position (right side position as viewed in FIGS. 1 and 2), where the stacks 90 stand by for the subsequent operation. The standby conveyor 11C may supply the stacks 90 to the feeding conveyor 11D if no stacks 90 exist on the feeding conveyor 11D. In this way, the transfer conveyor machine 11 may transfer the stacks 90 horizontally from the upstream side toward the downstream side, such that stacks 90 arranged in three rows may always exist on the feeding conveyor 11D.

Figure 3:
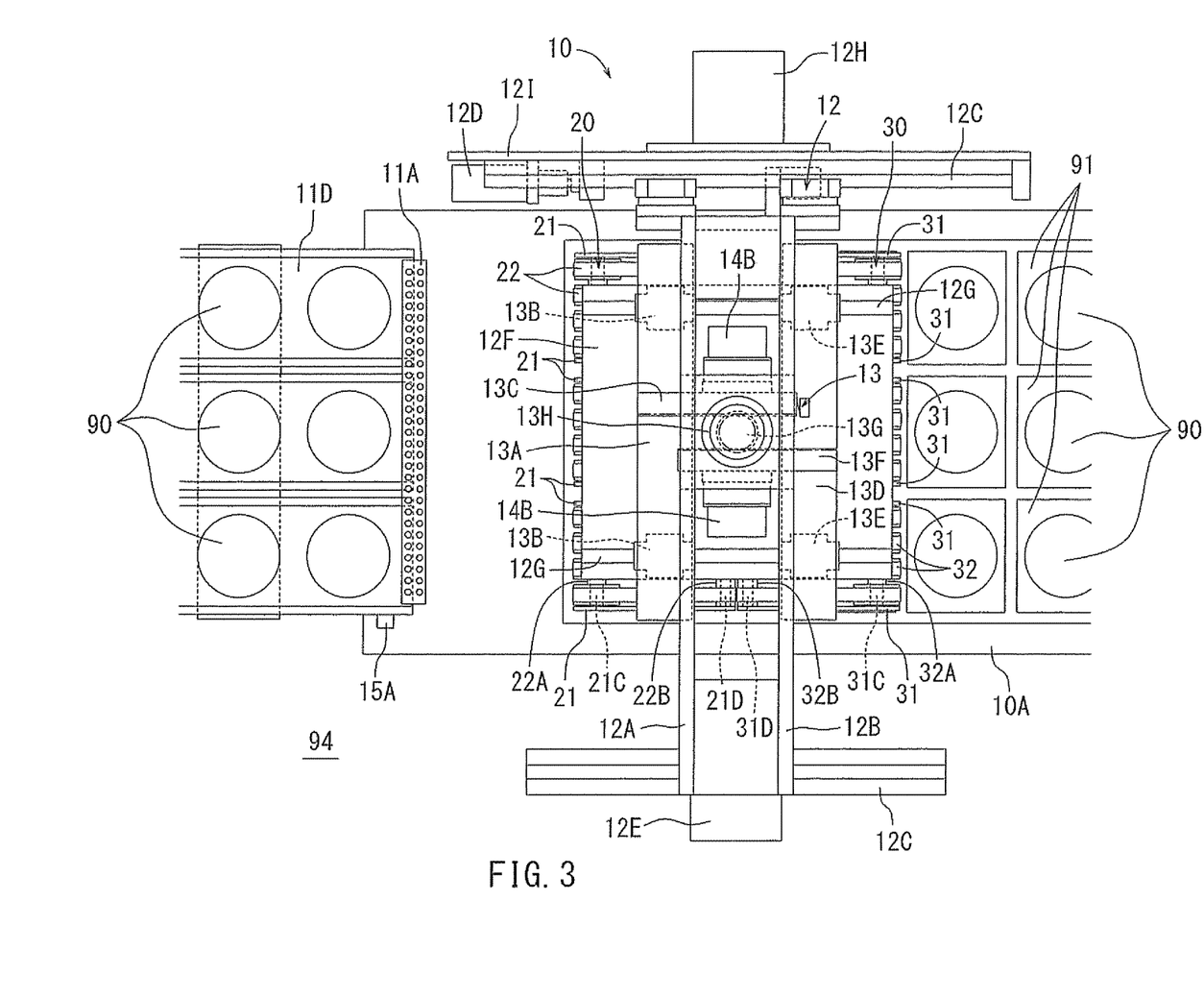
FIG. 3 is an enlarged view of a part of FIG. 1.

The control unit 15 shown in FIG. 2 may control the operation of the transfer conveyor machine 11. To this end, as shown in FIGS. 1 to 3, the control unit 15 may include a sensor 15A that may be attached to the feeding conveyor 11D for detecting the presence of the stacks 90 on the feeding conveyor 11D. Based on the result of detection by the sensor 15A, the control unit 15 may control the supply of the stacks 90 from the standby conveyor 11C to the feeding conveyor 11D.

As shown in FIGS. 1 and 2, the control unit 15 may further include sensors 15B and 15C attached to the standby conveyor 11C for recognizing the distribution of the stacks 90 on the standby conveyor 11C. Based on the result of recognition of the distribution of the stacks 90 by the sensors 15B and 15C, the control unit 15 may control the standby conveyor 11C to move the standby conveyor 11C for transferring the stacks 90 toward the downstream side (right side as viewed in FIGS. 1 and 2) or to stop the standby conveyor 11C in a standby mode.

In addition, the control unit 15 may continuously determine whether or not there exists a free area on the standby conveyor 11C. If a free area exists, additional stacks 90 can be fed onto the standby conveyor 11 C.

As long as the control unit 15 determines that there is no such a free area, the control unit 15 sends instructions to the wrapping sheet forming machine 93 to temporarily stop the forming and feeding of any stacks 90. In this way, it is possible to prohibit excessive loading of the transfer conveyor machine 11.

Figure 7:
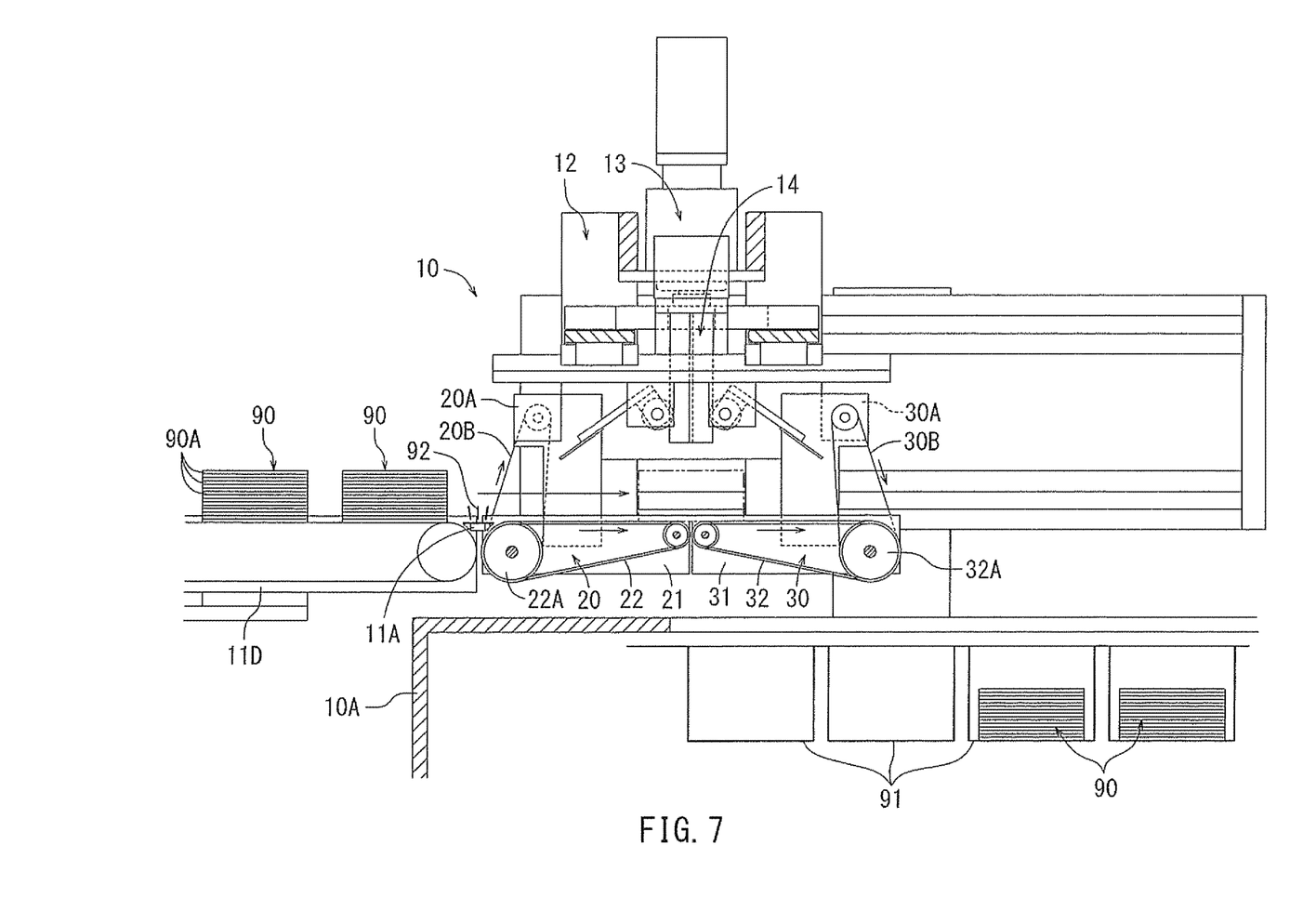
FIG. 7 is a view similar to FIG. 5 but showing the operation for feeding stacks of articles from a feeding conveyor to a first conveyor belt.
Figure 8:
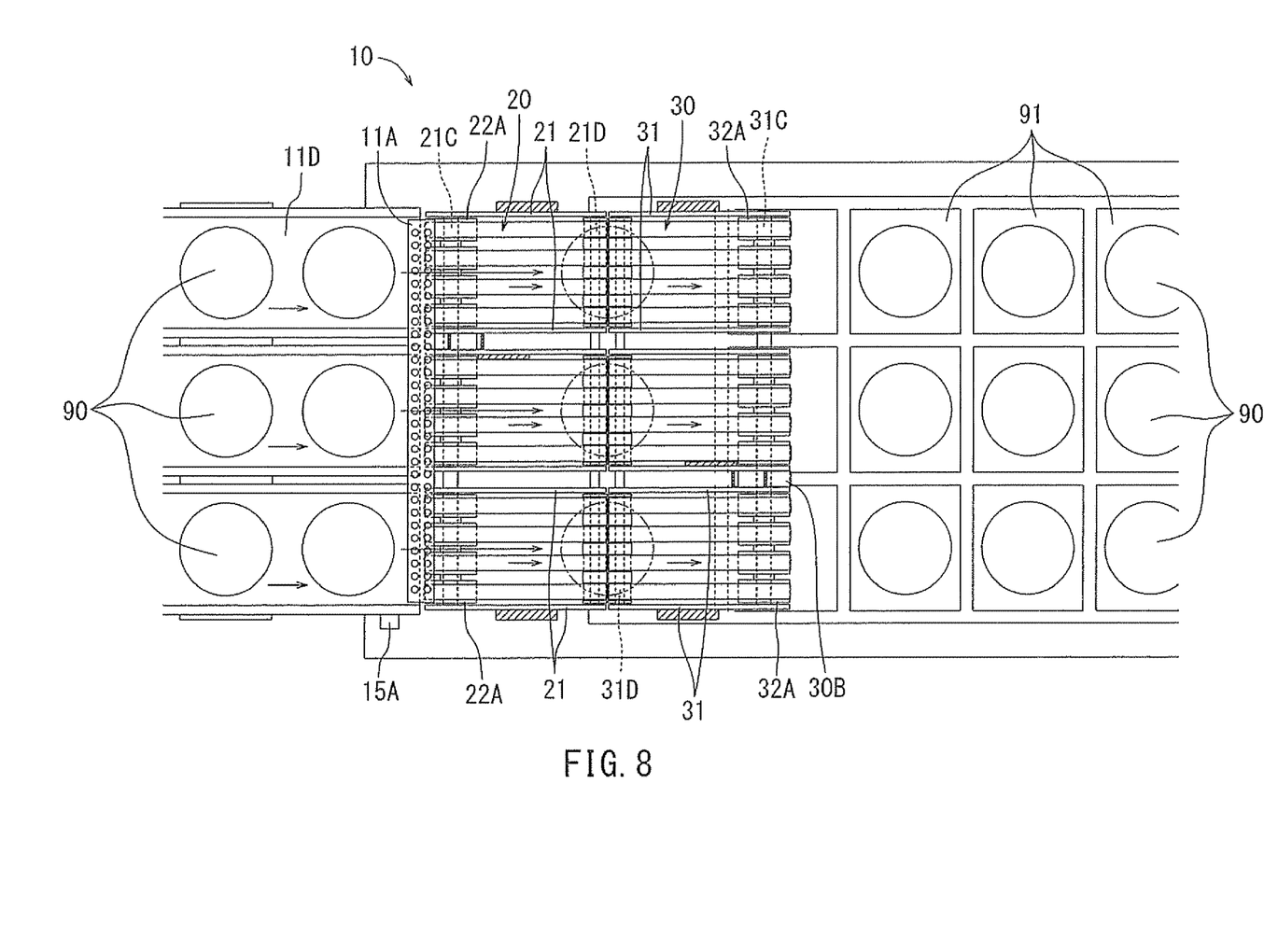
FIG. 8 is a view similar to FIG. 6 but showing the operation for feeding the stacks of articles from the feeding conveyor to the first conveyor belt.

As shown in FIGS. 7 and 8, the stacks 90 fed onto the feeding conveyor 11D may be further transferred onto the first shutter 20 from the downstream end of the feeding conveyor 11D (i.e., the downstream end of the transfer conveyor machine 11). As shown in FIG. 1, the first shutter 20 may be arranged along a horizontal line extending from the side of the feeding conveyor 11D (left side) toward the opposite side (right side as viewed in FIG. 7) of the feeding conveyor 11D. The automatic distributing device 11B and the conveyers 11C and 11D are all arranged along this horizontal line.

In this embodiment, the first shutter 20 is arranged in the right and left directions. The side of the feeding conveyor 11D (left side) with respect to the first shutter 20 will be referred to as a "first side", and the opposite side will be referred to as a "second side."

Figure 6:
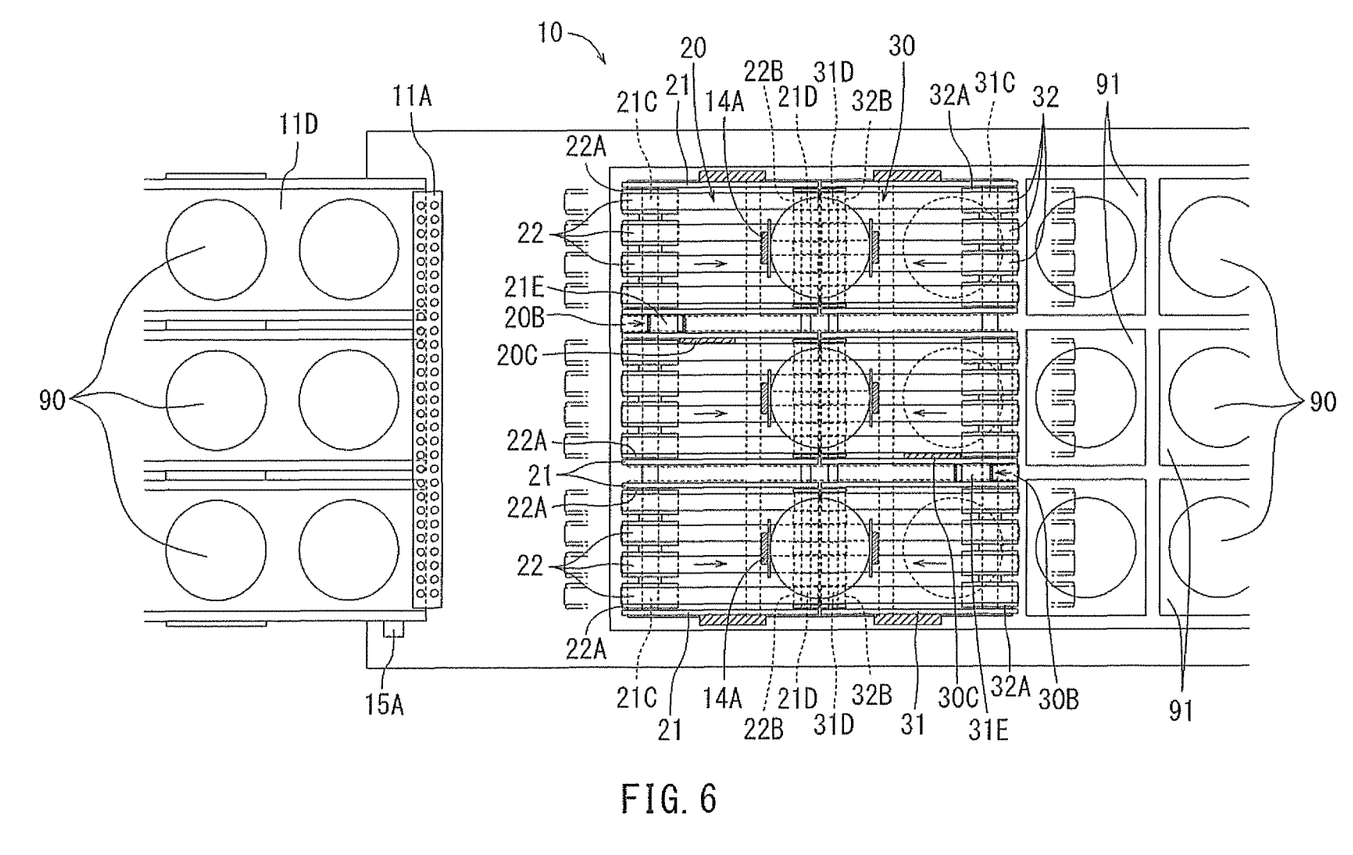
FIG. 6 is a sectional view taken along line VI-VI in FIG. 4 showing the operation for dropping stacks of articles into containers.
Figure 9:
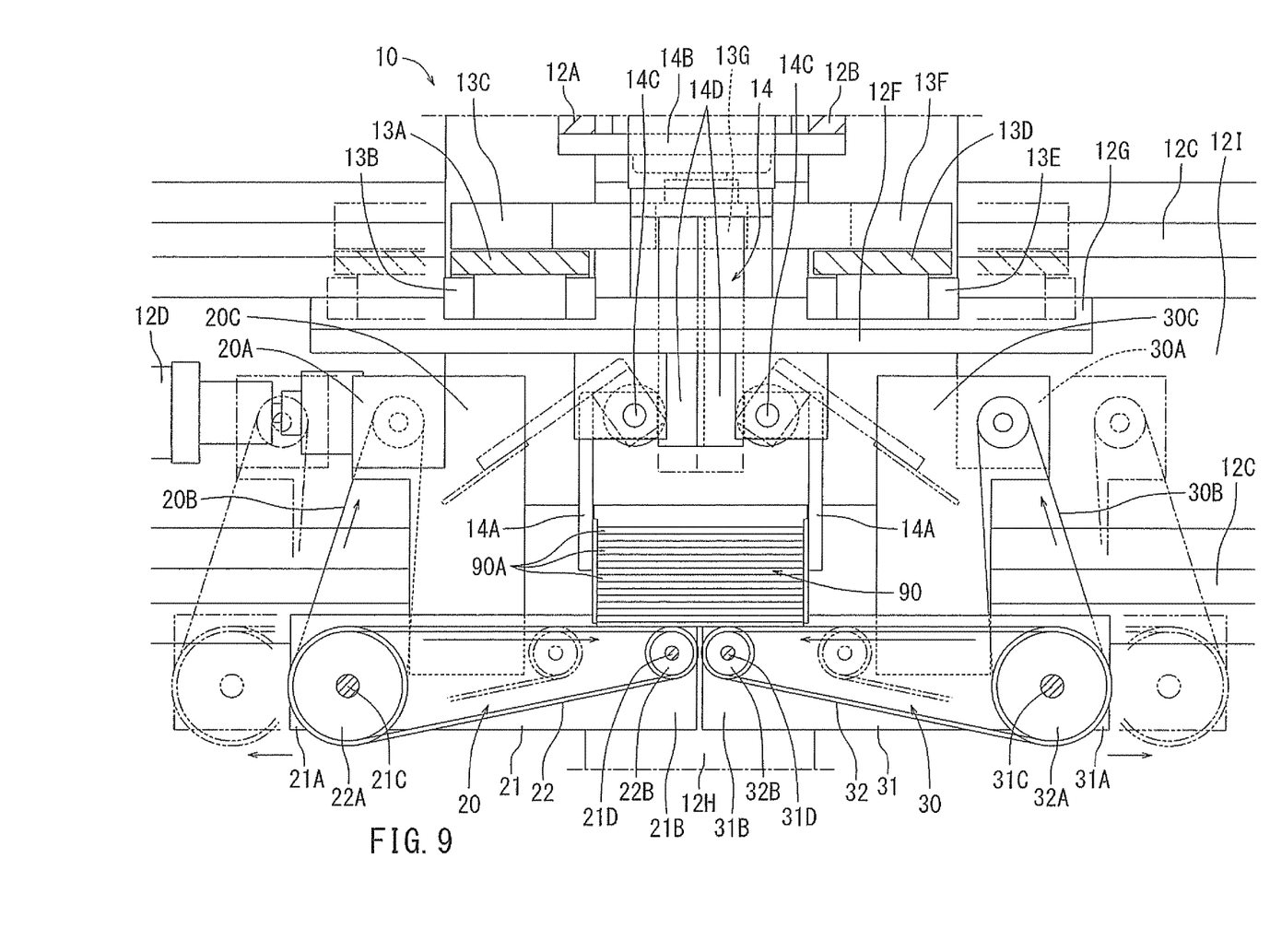
FIG. 9 is an enlarged view of a part of FIG. 5.

As shown in FIG. 6, the first shutter 20 may include three parallel shutter sections that respectively correspond to the three parallel conveyor sections of the feeding conveyor 11D. Each of the shutter sections may be supported between a pair of side plates 21 from opposite lateral sides (upper and lower sides as viewed in the plane shown in FIG. 6). As shown in FIG. 9, each of the side plates 21 may include a first base end portion 21A and a first leading end portion 21B positioned on the first side (left side) and the second side (right side), respectively.

As shown in FIGS. 6 and 9, the side plates 21 may be joined together at the first leading end portions 21B via a connecting shaft 21D having a round rod-like shape. As shown in FIG. 6, three sets of four first leading end side pulleys 22B, each configured as a toothed pulley, are rotatably mounted to the connecting shaft 21D at positions respectively corresponding to the three shutter sections of the first shutter 20.

As shown in FIGS. 6 and 9, a rotational shaft 21C having a round rod-like shape may be inserted into the first base end portions 21A (see FIG. 9) of the side plates 21 to extend therethough, so that the rotational shaft 21C can rotate relative to the side plates 21 about a rotational axis. As shown in FIGS. 6 and 8, three sets of four first base end side pulleys 22A each configured as a toothed pulley are fixedly mounted to the rotational shaft 21C at positions respectively corresponding to the three shutter sections of the first shutter 20.

As shown in FIGS. 6 and 9, three sets of four first conveyor belts 22 (see FIG. 6) each configured as a toothed belt may respectively engage the three sets of the first leading end side pulleys 22B and the three sets of the first base end side pulleys 22A to extend therebetween. In this way, as shown in FIG. 9, the upper surface of the first shutter 20 which receives and supports the stacks 90 may be formed by upper portions of the first conveyor belts 22. These first conveyor belts 22 extend horizontally from the side of the first leading end portions 21B toward the side of the first based end portions 21A.

In this way the connecting shaft 21D, the first leading end side pulleys 22B, the rotational shaft 21C, the first base end side pulleys 22A and the first conveyor belts 22 can collectively act as a belt conveyor supported by the side plates 21.

As shown in FIG. 3, two (the uppermost one and the lowermost one as seen in the plane of FIG. 6 in this embodiment) of the six side plates 21 supporting the three shutter sections may be fixedly mounted to a suspending frame 13A of a shutter opening and closing device 13. The suspending frame 13A may include a pair of sliders 13B. The pair of sliders 13B may protrude downward from the suspending frame 13A and may be slid along a pair of support rails 12G of a reciprocating slide device 12. The pair of support rails 12G may extend parallel to the arrangement direction of the first shutter 20. By applying force to the pair of sliders 13B, they may slide along the pair of support rails 12G in the shutter arrangement direction. The first shutter 20 may thereby move in a reciprocating manner relative to the reciprocating slide device 12.

In this way, the suspending frame 13A may serve as a support structure for supporting the side plates 21 and the belt conveyor of the first shutter 20.

As shown in FIGS. 3 and 4, the pair of support rails 12G may be mounted to the upper surface of a suspended plate 12F suspended from a pair of suspension beams 12A and 12B of the reciprocating slide device 12. The pair of suspension beams 12A and 12B may extend horizontally in a direction perpendicular to the shutter arrangement direction.

In this way, the pair of support rails 12G, the suspended plate 12F and the pair of suspension beams 12A and 12B may serve collectively as a support structure for slidably supporting the suspending frame 13A together with the side plates 21 and the belt conveyor of the first shutter 20 relative to a floor 94. As will be explained later, this support structure, together with side plates 31 and a belt conveyor of the second shutter 30, may also serve to slidably movably support a suspending frame 13D.

The pair of suspension beams 12A and 12B may be slidably supported by a pair of support posts 12E and 12H via three guide rails 12C extending longitudinally parallel to the shutter arrangement direction. The pair of support posts 12E and 12H are fixedly mounted to the floor 94 so as to extend vertically upward therefrom and are positioned on opposite sides (left and right sides as viewed in FIG. 4) of the container transfer conveyor 10A. As viewed in FIG. 4, one of the three guide rails 12C may be mounted to the upper end surface of the support post 12E positioned on the left side. The other two of the three guide rails 12C may be mounted to a lateral side surface (left surface as viewed in FIG. 4) of the support post 12H and may be vertically spaced apart from each other by a predetermined distance. The previously mentioned support post 12H is located on the right side as seen in the side-view plane shown in FIG. 4. This guide rail configuration for the three guide rails 12C enables the pair of suspension beams 12A and 12B to move together with the suspended plate 12F and the pair of support rails 12G collectively in the shutter arrangement direction relative to the support posts 12E and 12H. The first shutter 20 can also move relative to the pair of support rails 12G in the same direction.

As shown in FIGS. 1 and 3, a support beam 12I may be mounted to the lateral surface (left surface) of the support post 12H and may extend longitudinally in the shutter arrangement direction. The aforementioned two of the three guide rails 12C mounted to the lateral side surface of support post 12H may be mounted to the support beam 12I. In addition, an automated motorized device 12D may be mounted to the support beam 12I for moving the suspension beams 12A and 12B in the shutter arrangement direction under the control of the control unit 15 (see FIG. 2).

In this way, the support posts 12E and 12H may serve as a support structure for slidably supporting the suspension beams 12A and 12B along the guide rails 12C. These suspension beams 12A and 12B serve as the support structure for slidably movably supporting the first shutter 20 and the second shutter 30.

As shown in FIGS. 5 and 7, the reciprocating slide device 12 may move the suspension beams 12A and 12B along the guide rails 12C by the operation of the movement device 12D through its operation by control unit 15. As the suspension beams 12A and 12B move in this way, the first shutter 20 can move together with or relative to the suspension beams 12A and 12B along the pair of support rails 12G. This is accomplished by the operation of the shutter opening and closing device 13 as will be explained later. In this way, the first shutter 20 can move together with the suspension beams 12A and 12B. Also, as shown in FIGS. 7 and 8, the first base end side pulleys 22A may move between an article receiving position and a position away from the article receiving position in the horizontal direction. The article receiving position is located proximal to the downstream end of the transfer conveyor machine 11 (more specifically, the downstream end of the feeding conveyor 11D).

When the first base end side pulleys 22A are positioned at the article receiving position, the stacks 90 may be transferred from the downstream end of the feeding conveyor 11D onto the first conveyor belts 22 that engage the first based end side pulleys 22A. More specifically, in this embodiment, the stacks 90 may be transferred one by one such that three stacks 90 are transferred onto the respective three sets of four first conveyor belts 22.

As shown in FIGS. 1 to 3 and 5 to 8, an aseptic gas injection pipe 11A having a flat upper surface with a plurality of gas injection holes may be arranged at the downstream end of the feeding conveyor 11D so as to extend in a direction perpendicular to the shutter arrangement direction (where the gas pipe configuration extends in the upward to downward direction as viewed in the plane of FIG. 1). The aseptic gas injection pipe 11A may be connected to a pressurized gas supply source (not shown) via a sterilization filter (not shown), so that pressurized gas, such as air supplied from the pressurized gas supply source, may be sterilized by the sterilization filter before being injected from the gas injection holes of the aseptic gas injection pipe 11A.

The control unit 15 (see FIG. 2) may control the operation such that the pressurized gas is supplied to the aseptic gas injection pipe 11A when the first base end side pulleys 22A are positioned at the article receiving position. Therefore, as shown in FIG. 7, the aseptic gas used for the injection gas 92, may be injected upward from the gas injection holes of the aseptic gas injection pipe 11A. In this way, the aseptic gas injection pipe 11A may serve as a gas injection device.

The injection gas 92 may be injected upward at the downstream end of the transfer conveyor machine 11 to apply a force to the stacks 90 in a floating-up direction during the transfer of the stacks 90 from the transfer conveyor machine 11 to the first conveyor belts 22. Therefore, it may be possible to prevent the stacks 90 from sticking to or getting caught by the transfer conveyer machine 11 (more specifically, the feeding conveyor 11D) and the first conveyor belts 22 during the transfer to the first conveyor belts 22.

In this way, it may be possible to prevent deformation of the stacks 90 due to sticking or getting caught on the transfer conveyor machinery. Hence it is possible to fully preserve the commercial value of the stacks 90.

As shown in FIG. 6, a toothed pulley 21E may be fixedly mounted to the rotational shaft 21C of the first shutter 20 at a position between two adjacent shutter sections that are shown on the upper side. A drive motor 20A (see FIG. 9) may be mounted to a mount plate 20C that is fixedly mounted to one of two side plates 21 positioned on opposite sides of the toothed pulley 21E.

The rotation of the drive motor 20A may be transmitted to the toothed pulley 21E via a toothed belt 20B, so that the rotational shaft 21C rotates to drive the first conveyor belts 22 via the respective first base end side pulleys 22A. Therefore, the stacks 90 placed on the upper surfaces of the first conveyor belts 22, i.e., the upper surface of the first shutter 20, may move in the moving direction of the upper surfaces of the first conveyor belts 22.

The control unit 15 (see FIG. 2) may control the rotational direction and the rotational speed of the drive motor 20A. Therefore, the upper surface of the first shutter 20 may move in a direction toward the first leading end portions 21B of the side plates 21 (rightward as indicated by the arrow at the upper portion of the first conveyor belts 22 as viewed in the plane shown in FIG. 9) or in an opposite direction toward the first base end portions 21A (leftward as viewed in the plane shown in FIG. 9) at a controlled speed. In this way, the first shutter 20 can move the stacks 90 toward the first side (leftward as viewed in FIG. 7) or toward the second side (rightward as viewed in FIG. 5) of the first shutter 20 at a controlled speed.

A second shutter 30 may be arranged on the second side of the first shutter 20. As shown in FIGS. 5 through 9, the second shutter 30 may oppose the first shutter 20 in the longitudinal direction of the first shutter 20. More specifically, as shown in FIGS. 6 and 8, the second shutter 30 may be arranged so as to extend from the second side of the second shutter toward the first side (leftward as viewed in FIGS. 6 and 8).

As shown in FIGS. 4 and 8, the second shutter 30 may include three parallel shutter sections that respectively correspond to the three parallel shutter sections of the first shutter 20. Each of the shutter sections of the second shutter 30 may be supported between a pair of side plates 31 from opposite lateral sides (upper and lower sides as viewed in the plane shown in FIG. 4). As shown in FIG. 9, each of the side plates 31 may include a second base end portion 31A and a second leading end portion 31B positioned on the second side (right side) and the first side (left side), respectively.

Except for when they drop the stacks 90, the first shutter 20 and the second shutter 30 may be held at closed positions where the first leading end portions 21B of the side plates 21 and the second leading end portions 31B are positioned proximal to each other. This is shown in FIG. 9 and will be explained later.

As shown in FIGS. 8 and 9, the side plates 31 may be joined together at the second leading end portions 31B via a connecting shaft 31D having a round rod-like shape. As shown in FIG. 6, three sets of four second leading end side pulleys 32B are configured as a toothed pulley and rotatably mounted to the connecting shaft 31D at positions respectively corresponding to the three shutter sections of the second shutter 30.

As shown in FIGS. 4, 8 and 9, a rotational shaft 31C may be inserted into the second base end portion 31A (see FIG. 9) of the side plates 31 to extend therethough, so that the rotational shaft 31C can rotate relative to the side plates 31. As shown in FIGS. 6 and 8, three sets of four second base end side pulleys 32A configured as a toothed pulley may be fixedly mounted to the rotational shaft 31C at positions respectively corresponding to the three shutter sections of the second shutter 30.

As shown in FIGS. 6 and 9, three sets of four second conveyor belts 32 configured as a toothed belt may respectively engage the three sets of the second leading end side pulleys 32B and the three sets of the second base end side pulleys 32A to extend therebetween. In this way, as viewed in FIG. 5, the upper surface of the second shutter 30 for receiving and supporting the stacks 90 may be formed by upper portions of the second conveyor belts 32 that extend horizontally from the side of the second leading end portions 31B toward the side of the second based end portions 31A.

As shown in FIG. 3, two (the uppermost one and the lowermost one shown in FIG. 6 in this embodiment) of the six side plates 31 supporting the three shutter sections may be fixedly mounted to the suspending frame 13D of the shutter opening and closing device 13. The suspending frame 13D may include a pair of sliders 13E. As shown in FIGS. 3 and 4, the pair of sliders 13E may protrude downward as viewed in FIG. 4 from the suspending frame 13D. They can be slid along the pair of support rails 12G of the reciprocating slide device 12. The pair of support rails 12G may extend longitudinally parallel to the arrangement direction of the first shutter 20.

In this way, the second shutter 30 can move relative to the pair of support rails 12G in the shutter arrangement direction by way of the pair of sliders 13E. The pair of support rails 12G can move together with the suspension beams 12A and 12B relative to the support posts 12E and 12H that are fixed to the floor 94 as described previously.

As described previously, the reciprocating slide mechanism 12 may move the suspension beams 12A and 12B along the guide rails 12C by the operation of the movement device 12D. In this way, the first shutter 20 and the second shutter 30 can move together with the suspension beams 12A and 12B. Additionally, the first shutter 20 and the second shutter 30 can move relative to the suspension beams 12A and 12B along the pair of support rails 12G by the operation of the shutter opening and closing device. This will be explained later.

As shown in FIGS. 4, 6 and 8, a toothed pulley 31E may be fixedly mounted to the rotational shaft 31C of the second shutter 30 at a position between two adjacent shutter sections that are shown on the lower side of FIG. 6. A drive motor 30A (see FIG. 4) may be mounted to a mount plate 30C. The mount plate 30 C may be fixedly mounted to one of two side plates 31 positioned on opposite sides of the toothed pulley 31E.

The rotation of the drive motor 30A may be transmitted to the toothed pulley 31E via a toothed belt 30B. In this way, the rotational shaft 31C rotates to drive the second conveyor belts 32 via the respective second base end side pulleys 32A. Therefore, the stacks 90 placed on the upper surfaces of the second conveyor belts 32, i.e., the upper surface of the second shutter 30, may move in the moving direction of the upper surfaces of the second conveyor belts 32.

The control unit 15 (see FIG. 2) may control the rotational direction and the rotational speed of the drive motor 30A.

Therefore, the upper surface of the second shutter 30 may move at a controlled speed in a direction toward the second leading end portions 31B of the side plates 31 (leftward as viewed in FIG. 9) or in a direction toward the second base end portions 31A of the side plates 31 (rightward as viewed in FIG. 9). In this way, the second shutter 30 can move the stacks 90 at a controlled speed toward the first side (leftward as viewed in FIG. 5) or the second side (rightward as viewed in FIG. 5).

An article clamping device 14 may be mounted to the suspended plate 12F suspended from the pair of suspension beams 12A and 12B. The article clamping device 14 may include three sets of first and second clamping members 14A (see FIG. 5) and a pair of rack moving devices 14B (see FIG. 4). As shown in FIGS. 4 and 9, the three sets of first and second clamping members 14A are respectively arranged so as to correspond to the three sets of shutter sections of the first and second shutters 20 and 30, respectively. The article clamping device 14 may further include a pair of support rods 14C each having a pinion and extending parallel to each other in directions perpendicular to the shutter arrangement direction (see FIG. 9). One of the support rods 14C may extend though the first clamping members 14A of the three sets so as to connect them to each other. The other of the support rods 14C may extend through the second clamping members 14A so as to connect them to each other. As shown in FIG. 9, the support rods 14C may be rotatably supported by brackets that are fixedly attached to the lower surface of the suspended plate 12F.

The rack moving devices 14B may be respectively connected to vertical racks 14D that engage the pinions of the support rods 14C. For example, the rack moving devices 14B may be hydraulic or pneumatic cylinders that can vertically move the vertical racks 14D upward and downward. One of the pinions of the support rods 14C may rotate in order to rotate the corresponding support rod 14C and to eventually cause movement of the first clamping members 14A. The other of the pinions of the support rods 14C may rotate in order to rotate the corresponding support rod 14C and to eventually cause movement of the second clamping members 14A.

The rack moving devices 14B may be controlled by the control unit 15 (see FIG. 2) such that the second clamping members 14A move in sync with the first clamping members 14A but in a direction opposite to the moving direction of the first clamping members 14A. More specifically, each of the first and second clamping members 14A moves from a standby position indicated by chain lines in FIG. 9 to a clamping position indicated by solid lines in FIG. 9. Here, as indicated by the solid lines, each of the first and second clamping members 14A extends vertically downward. Preferably, each of the first and second clamping members 14A may reciprocate two times from the standby position to the clamping position.

During their reciprocating movements, the first and second clamping members 14A may be positioned above the first leading end side pulleys 22B and the second leading end side pulleys 32B. At this same time, the first shutter 20 and the second shutters 30 are at the closed positions. In this way, the first and second clamping members 14A may not interfere with the operation of the first shutter 20 and the second shutter 30.

The first and second clamping members 14A may operate to clamp and release the stacks 90 from opposite sides (left and right sides in the shutter arrangement direction) when the stacks 90 are positioned between the first conveyor belts 22 and the second conveyor belts 32.

In this connection, the first shutter 20 is positioned at the article receiving position proximal to the downstream end of the transfer conveyor machine 11 when the first shutter 20 and the second shutter 30 are positioned at the closed positions. At this time, the control unit 15 may move the upper surfaces of the first conveyor belts 22 and the second conveyor belts 32 toward the second side (right side as viewed in FIG. 9) at a controlled speed within a predetermined period of time, as the stacks 90 are transferred from the feeding conveyor 11D to the first conveyor belts 22. When the three stacks 90 transferred from the feeding conveyor 11D extend over and between the first conveyor belts 22 of the first shutter 20 and the second conveyor belts 32 of the second shutter 30, the movement of the first conveyor belts 22 and the second conveyor belts 32 may be stopped.

After that, the control unit 15 may control the movement device 12D of the reciprocating slide device 12 such that the suspension beams 12A and 12B of the reciprocating slide device 12 move toward the second side (right side as viewed in FIG. 5) from the article receiving position. At this time, the first shutter 20 and the second shutters 30, which are supported by the suspension beams 12A and 12B, are kept at the closed positions. Here, the three stacks 90 extending over the first shutter 20 and the second shutter 30 may be dropped from the shutter device. This will further be explained later.

When the first and second shutters 20 and 30 have reached to the position shown in FIG. 5, the control unit 15 may operate the article clamping device 14 so that the first and second clamping members 14A move to reciprocate two times from the standby position to the clamping position. In this way, the first and second clamping members 14A may correctly position the stacks 90 so that they are appropriately positioned over and evenly supported from opposite sides of the first conveyor belts 22 and the second conveyor belts 32. At the same time, by moving the clamping members in this manner, the stacked articles 90A in each of the stacks 90 (see FIG. 5) may be correctly positioned so as to be aligned with respect to each other in the vertical direction.

Further, the control unit 15 may operate the container conveyor 10A in sync with movement of the first and second clamp members 14A, such that three of the containers 91 for receiving the stacks 90 are located on the lower side of the stacks 90 that are to be dropped.

In this embodiment, as shown in FIGS. 6 and 9, the outer diameter of the first leading end side pulleys 22B is smaller than the outer diameter of the first base end side pulleys 22A. Similarly, the outer diameter of the second leading end side pulleys 32B is smaller than the outer diameter of the second base end side pulleys 32A.

Due to this arrangement, it may be possible to minimize a space formed between downwardly curved opposing portions of the first leading end side pulleys 22B and the second leading end side pulleys 32B on the lower side of the stacks 90. In this way, it may be possible to minimize the potentially downward concaving deformation of the stacks 90, where the smaller form factor of the pulleys allow for a shorter space in between. Otherwise, concave deformation may be caused due to the dropping of the central portions of the stacks 90 into the space.

The opening and closing device 13 will now be described. As shown in FIG. 3, racks 13C and 13F may be respectively fixedly attached to the suspending frames 13A and 13D so as to extend parallel to each other in the shutter arrangement direction (left to right direction as viewed in FIG. 3). The racks 13C and 13F may be arranged such that the teeth of the rack(s) 13C and the rack 13F are opposed to each other. A pinion 13G may be positioned between the racks 13C and 13F so as to engage the teeth of both racks 13C and 13F.

The pinion 13G may be fixedly mounted to a drive shaft of a drive motor 13H. The drive motor 13H may be supported on a support bracket that is fixedly attached to the suspension beams 12A and 12B of the reciprocating slide device 12. The drive motor 13H serves as a drive source of the opening and closing device 13 and may be controlled by the control unit 15 with respect to the rotational direction and the rotational speed of the drive shaft.

With this arrangement, as the drive shaft of the drive motor 13H rotates, the racks 13C and 13F move in opposite directions at the same speed through engagement with the pinion 13G. As the rack 13C moves in this manner, the suspending frame 13A and the side plates 21, to which the suspending frame 13A is mounted, moves together with the rack 13C. As the rack 13F moves, the suspending frame 13A and the side plates 31 (to which the suspending frame 13A is mounted) moves together with the rack 13F. In this way, the first shutter 20 and the second shutter 30 may move between the closing and opening positions. As shown in FIG. 9, as described previously, when the first shutter 20 and the second shutter 30 are at the closed positions, the first leading end portions 21B of the side plates 21 and the second leading end portions 31B are positioned proximal to each other in order to close the shutter.

The control unit 15 may control the first shutter 20 and the second shutter 30 such that they move from the closing position to the opening position after the clamping and releasing operations by the clamping members 14A have been finished. Preferably, this occurs before three of the containers 91 have their upper openings positioned on the lower side of the stacks 90 as shown in FIGS. 5 and 6.

As the first and second shutters 20 and 30 move from the closed positions to the opening positions, the stacks 90 may be dropped from the first and second shutters 30 and into the containers 91 (see FIG. 5).

When the first and second shutters 20 and 30 move from the opening positions to the closed positions, the control unit 15 may operate to start the drive motor 20A of the first conveyor belts 22 and the drive motor 30A of the second conveyor belts 32. When this occurs, the upper portions of the first conveyor belts 22 move toward the second side (right side) and the upper portions of the second conveyor belts 32 move toward the first side (left side). In other words, the upper portions of the first conveyor belts 22 and the upper portions of the second conveyor belts 32 move in directions toward each other.

Therefore, the first conveyor belts 22 may force portions of the stacks 90 (more specifically, the lower surfaces of the lowermost stacked articles 90A of the stacks 90) which contact the first conveyor belts 22 towards the side of the second base end portions 31A (right side as viewed in FIG. 5). Simultaneously, the second conveyor belts 32 may force the portions of the stacks 90 (more specifically, the lower surfaces of the lowermost stacked articles 90A of the stacks 90) which contact the second conveyor belts 32 to move toward the side of the first base end portions 21A (left side as viewed in FIG. 5).

As the first shutter 20 and the second shutter 30 move to the opening positions for dropping the stacks 90, the control unit 15 may operate the drive motor 20A of the first conveyor belts 22 and the drive motor 30A of the second conveyor belts 32 in sync with movement of the drive motor 13H of the opening and closing device 13. More specifically, the upper portions of the second conveyor belts 32 move at the same speed as the moving speed of the upper portions of the first conveyor belts 22 while the moving direction of the upper portions of the second conveyor belts 32 is opposite to the moving direction of the upper portions of the first conveyor belts 22. In addition, the upper portions of the first conveyor belts 22 move at the same speed as the speed of movement of the first shutter 20 from the closed position to the opening position, while the moving direction of the upper portions of the first conveyor belts 22 is opposite to the moving direction of the first shutter 20. Similarly, the upper portions of the second conveyor belts 32 move at the same speed as the speed of movement of the second shutter 30 from the closed position to the opening position, while the moving direction of the upper portions of the second conveyor belts 32 is opposite to the moving direction of the second shutter 30.

The control unit 15 may be further configured to output control signals to the drive motor 20A of the first conveyor belts 22 and the drive motor 30A of the second conveyor belts 32, respectively. The output control signals are such that the upper portions of the first and second conveyor belts 22 and 32 conveying the stack of articles move in the same direction until the stacks 90 are positioned between the first and second conveyor belts 22 and 32. After the stacks 90 are positioned between the first and second conveyor belts 22 and 32, the upper portions of the first and second conveyor belts 22 and 32 move in directions toward each other, as the first and second shutters 20 and 30 move from the closed positions to the open positions.

With this arrangement, the relative position of the stacks 90 to the portions of the upper surfaces of the first and second conveyor belts 22 and 32 contacting the stacks 90 is not substantially changed during the movement of the first shutter 20 and the second shutter 30 from the closed positions to the opening positions for dropping the stacks 90. In other words, no substantial kinetic frictional forces may be applied to the bottom surfaces of the stacks 90 by the movement of the first and second shutters 20 and 30. In this way, the position of the stacks 90 in the first and second directions (right and left direction) may not be changed during the movement of the first shutter 20 and the second shutter 30 from the closed positions to the opening positions. Thus, a variation in the dropped position of the stacks 90 can be avoided or minimized.

After the stacks 90 have been dropped into the containers 91, the control unit 15 may operate the drive motor 13H of the opening and closing device 13 to move the first and second shutters 20 and 30 back to the closed positions. Thereafter, the control unit 15 may operate the movement device 12D of the reciprocating slide device 12 such that the first and second shutters 20 and 30 move to the left from the position shown in FIG. 5 to the article receiving position for receiving the next stacks 90 from the feeding conveyor 11D.

These operations for receiving three rows of stacks 90 from the feeding conveyor 11D and dropping them into the containers 91 by the article dropping apparatus 10 may be repeatedly performed.

The above embodiment may be modified in various ways as described as follows:

(1) In the above embodiment, wrapping sheets for gyoza are described as an example of the stacked articles. However, the above teachings of the article dropping apparatus 10 may be also applied to any other stacked articles, such as egg roll wrappers, wrappings sheets for wontons or spring rolls, and sliced meat or ham.

(2) While the article dropping apparatus 10 may be used for dropping the stacks 90 into the containers 91 of the deeply drawn packages, the present teachings may be also applied to other containers, such as those used for tray packages. In addition, although the article dropping apparatus 10 is configured to drop three stacks at one time, the number of the stacks to be dropped may be varied.

(3) The aseptic gas injection pipe 11A typically injects air sterilized by the sterilization filter, however, the aseptic gas may be a different gas. For example, the aseptic gas may be air that is sterilized by heat. If the surrounding air has a high cleanliness, the surrounding air may be injected without being processed. The aseptic gas may be nitrogen gas or argon gas. Further, it may be possible to mix sprinkling flour into the aseptic gas.

(4) In some of the above embodiments when the first shutter 20 and the second shutter 30 move to the open positions for dropping the stacks 90, the first conveyer belts 22 and the second conveyor belts 32 have been forcibly operated to move in directions toward each other. However, the first conveyer belts 22 and the second conveyor belts 32 may be configured such that they are free to circulate. In such a case, the relative position of the stacks 90 to the portions of the upper surfaces of the first conveyer belts 22 and the second conveyor belts 32 contacting the stacks 90 may be kept by the frictional forces applied by the weight of the stacks 90. Therefore, the frictional force applied from the stacks 90 may cause movement of the upper portions of the first conveyer belts 22 toward the second side (rightward as viewed in FIG. 5) and may cause the movement of the upper portions of the second conveyer belts 32 toward the first side (leftward as viewed in FIG. 5). In this way, a variation in the dropped position of the stacks 90 can also be avoided or minimized.

What is claimed is:

1. An article dropping apparatus comprising:
a first shutter horizontally movable between an open position and a closed position along a first direction, and
a second shutter horizontally movable between an open position and a closed position along the first direction;
a microcontroller;

wherein the controller is programmed to move the second shutter from its closed position to its open position as the first shutter moves from its closed position to its open position, respectively;

wherein the first shutter and the second shutter are configured to allow a stack of articles to drop from between the first shutter and the second shutter as the first and second shutters move from the closed positions to the open positions;

wherein the first shutter comprises a first conveyor having a first conveyer belt;

wherein the second shutter comprises a second conveyor having a second conveyor belt;

wherein the first conveyor belt and the second conveyor belt are configured to support the stack of articles such that, when the first and second shutters are positioned at the closed positions, the stack is positioned between the first and the second conveyor belt, such that the stack has a first portion supported by an upper portion of the first conveyor belt and a second portion supported by an upper portion of the second conveyor belt; and wherein the first conveyor and the second conveyer are configured such that the upper portion of the first conveyor belt and the upper portion of the second conveyor belt move in directions toward each other, as the first and second shutters move from the closed positions to the open positions, and a first motorized drive device configured by the controller to move the first and second shutters from the closed positions to the open positions in sync with each other; and a second motorized drive device comprising a separate toothed pulley, a toothed belt, and a drive motor, for each conveyor belt respectively configured by the microcontroller to move the first conveyor belt and the second conveyor belt at a same speed in opposite directions in sync with the movement of the first motorized drive device moving the first shutter and the second shutter from the closed positions to the open positions;

wherein the moving speed of the first conveyor belt and the second conveyor belt is determined such that the relative position of the stack to portions of the first and second conveyor belts contacting the stack does not substantially change during the movement of the first and second shutters from the closed positions to the open positions.

2. The article dropping apparatus according to claim 1, wherein:

the microcontroller is further configured to output control signals to the first and second drive devices such that the upper portions of the first and second conveyor belts conveying the stack of articles move in a same direction until the stack of articles are positioned between the first and second conveyor belts, where the stack is on the upper portion of both belts.

3. The article dropping apparatus according to claim 2, wherein:

the first shutter includes a first leading end opposed to the second shutter, and a first base end opposite to the first leading end, where both ends comprise a toothed pulley about which the first conveyor belt rotates, the first leading end toothed pulley being smaller in diameter than that of the first base end;

the second shutter includes a second leading end opposed to the first shutter and a second base end opposite to the second leading end, where both ends comprise a toothed pulley about which the second conveyor belt rotates, the second leading end toothed pulley being smaller in diameter than that of the second base end; and the first leading end of the first shutter and the second leading end of the second shutter are positioned proximal to each other when the first and second shutters are positioned at the closed positions.

4. The article dropping apparatus according to claim 3, further comprising:

a feeding conveyor configured to convey a plurality of stacks of articles and to feed the plurality of stacks of articles one after another to the first conveyor of the first shutter wherein the feeding conveyor includes a plurality of parallel conveyor sections, wherein the apparatus also includes a standby conveyor also including a plurality of parallel conveyor sections, and an automatic distributing device, wherein the automatic distributing device, the standby conveyor, and the feeding conveyor are aligned in a horizontal direction, where the controller transfers stacks of articles from the automatic distributing device to the a plurality of parallel sections of the standby conveyor, which in turn transfers rows of stacks to the feeding conveyor, wherein by sensing the presence of stacks on the feeding conveyor, if there is an absence of stacks on the feeding conveyor at a certain row, the standby conveyor transfers stacks to that row of the feeding conveyor, such that a plurality of rows of stacks always exist on the feeding conveyor.

5. The article dropping apparatus according to claim 4, further comprising:

a support structure comprising a suspending frame configured to support the first shutter and the second shutter; and a motorized device configured by the microcontroller through programming to move the support structure between a first position and a second position along longitudinal rails;

wherein the feeding conveyor includes an upstream end and a downstream end along a conveying direction of the plurality of stacks of articles; and wherein the first based end portion of the first shutter is positioned proximal to the downstream end of the feeding conveyor when the support structure is positioned at the first position.

6. The article dropping apparatus according to claim 5, further comprising a gas injection device located at the downstream end of the feeding conveyor, wherein:

the gas injection device is a pipe with a flat upper surface configured to inject gas upward toward each stack of articles from below, as programmed by the microcontroller, for facilitating transfer of each stack of articles to the first conveyor belt of the first shutter when the support structure is positioned at the first position.

7. The article dropping apparatus according to claim 1, further comprising a clamping device configured to hold in position and align the stack of articles, supported at their base between the first shutter and the second shutter by the upper portions of the conveyor belts of both shutters, when the first shutter and the second shutter are positioned at the closed positions.

8. A method for operating an article dropping apparatus including:

a first shutter horizontally movable between an open position and a closed position along a first direction, and a second shutter horizontally movable between an open position and a closed position along the first direction;

a microcontroller;

wherein the first shutter comprises a first conveyor having a first conveyer belt;

wherein the second shutter comprises a second conveyor having a second conveyor belt;

wherein the first conveyor belt and the second conveyor belt are configured to support a stack of articles such that, when the first and second shutters are positioned at the closed positions, the stack is positioned between the first and the second conveyor belt, such that the stack has a first portion supported by an upper portion of the first conveyor belt and a second portion supported by an upper portion of the second conveyor belt;

the method comprising:

moving the second shutter from its closed position to its open position as the first shutter moves from its closed position to its open position, respectively;

wherein the upper portion of the first conveyor belt and the upper portion of the second conveyor belt move in directions toward each other, as the first and second shutters move from the closed positions to the open positions, and moving the first and second shutters from the closed positions to the open positions in sync with each other; and moving the first conveyor belt and the second conveyor belt at a same speed in opposite directions in sync with the movement of the first shutter and the second shutter from the closed positions to the open positions;

wherein the moving speed of the first conveyor belt and the second conveyor belt is determined such that the relative position of the stack to portions of the first and second conveyor belts contacting the stack does not substantially change during the movement of the first and second shutters from the closed positions to the open positions.

9. The method according to claim 8, wherein:

the upper portions of the first and second conveyor belts conveying the stack of articles move in a same direction until the stack of articles are positioned between the first and second conveyor belts, where the stack is on the upper portion of both belts, wherein the first and second shutters further comprise pulleys about which the first and second conveyor belts rotate, wherein moving from the closed to the open position of the first and second shutters involves the lateral shift of the pulleys about which the conveyor belt is rotating, while said rotation is occurring.

10. The method according to claim 8, further comprising:

utilizing a feeding conveyor configured to convey a plurality of stacks of articles, and to feed the plurality of stacks of articles one after another to the first conveyor of the first shutter, wherein the feeding conveyor includes parallel conveyor sections, wherein the method also utilizes a standby conveyor also including parallel conveyor sections, and an automatic distributing device, wherein the automatic distributing device, the standby conveyor, and the feeding conveyor are aligned in a horizontal direction, where the method includes transferring stacks of articles from the automatic distributing device to the parallel sections of the standby conveyor, which, in turn, transfers rows of stacks to the feeding conveyor, wherein the method further includes sensing the presence of stacks on the feeding conveyor, where if there is an absence of stacks on the feeding conveyor at a certain row, the standby conveyor transfers stacks to that row of the feeding conveyor, such that rows of stacks always exist on the feeding conveyor.

11. The method according to claim 10, further comprising:

utilizing a support structure comprising a suspending frame configured to support the first shutter and the second shutter; and moving the support structure between a first position and a second position along longitudinal rails.

12. The method according to claim 11, further comprising utilizing a gas injection device located at the downstream end of the feeding conveyor, wherein:

the method includes injecting gas upward toward each stack of articles from below, at a specific time point as the stack passes a certain position, facilitating smooth transfer of each stack of articles to the first conveyor belt of the first shutter when the support structure is positioned at the first position.

* * * * *